A. H. SCHLUETER.
MILK HEATER.
APPLICATION FILED MAY 20, 1908.
940,367.
Patented Nov. 16, 1909.
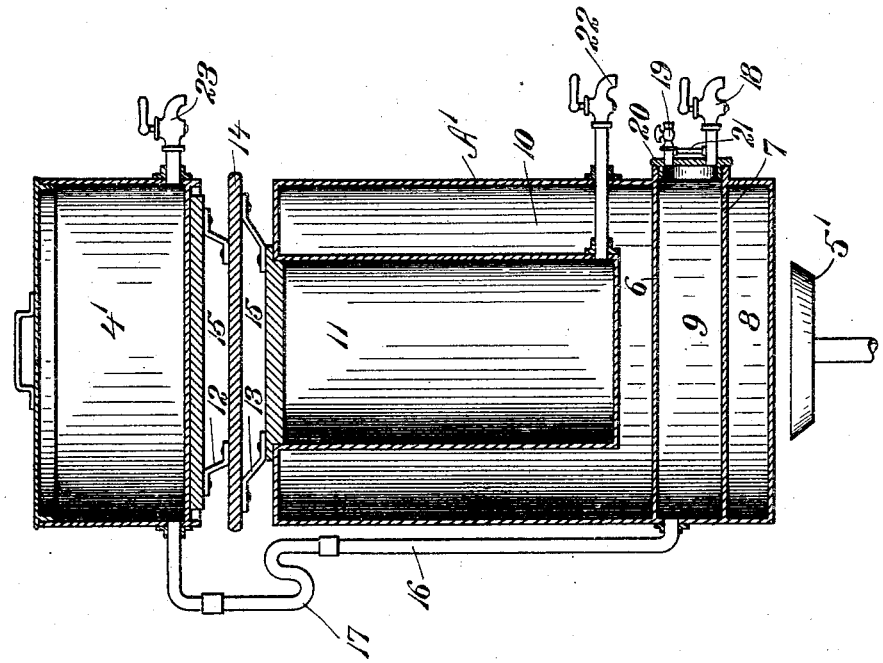

UNITED STATES PATENT OFFICE.

ADOLPH H. SCHLUETER, OF OAKLAND, CALIFORNIA.

MILK-HEATER.

940,367.   Specification of Letters Patent.   Patented Nov. 16, 1909.

Application filed May 20, 1908.  Serial No. 433,845.

*To all whom it may concern:*

Be it known that I, ADOLPH H. SCHLUETER, citizen of the United States, residing at Oakland, in the county of Alameda and State of California, have invented new and useful Improvements in Milk-Heaters, of which the following is a specification.

My invention relates to devices for heating milk, and pertains especially to a milk heater for use in hotels, restaurants and the like.

The object of the invention is to provide a means by which only the amount of milk which is to be immediately drawn off, or to be drawn off in a short time, will be heated; fresh supplies of milk to be heated being furnished automatically as needed, thereby preventing the milk from deteriorating by standing for any length of time after being heated; because where milk is heated and allowed to stand, or where it is heated in an open vessel, the cream will rise and form a scum on the surface of the milk, and this will become dried up, so that eventually the richness of the milk becomes considerably impaired.

The invention consists of the parts and the construction and combination of parts as hereinafter more fully described and claimed, having reference to the accompanying drawings, in which the figure is a sectional elevation of a milk heater embodying my invention.

In the said drawing, A' represents a casing of any suitable size, shape and description, divided by the partitions 6—7 into three compartments 8—9—10. The gas burner 5' is arranged beneath the lower hot water bath 8; the hot milk tank 9 being heated by the water in the tank 8, and tank 10 containing water in which the coffee-urn 11 is submerged. The cold milk tank 4' is placed above, and is suitably insulated from the tank A' beneath, by being raised up on legs 12—13, with an intermediate wood partition 14 to provide the insulating air spaces 15. The hot milk tank 9 is connected with the cold milk supply tank 4' by a pipe 16 in which is disposed a trap 17. The milk tank 9 has a draw-off cock 18 and an air vent cock 19, which is usually closed. These cocks are secured in the removable head 20 which is adapted to screw into one side of the milk tank 9 and is made readily removable, so as to permit access to the interior of the hot milk reservoir 9 for the purposes of cleaning, etc. A gage glass 21 may be provided on the cover 20 whereby the level of the milk in the chamber 9 may be observable to the operator. The coffee-urn has a draw-off cock 22, and the cold milk supply reservoir has a suitable draw-off cock 23. Fresh accretions of cold milk are fed automatically into the hot milk tank 9, as needed. By providing a trap, as 17, a body of air will usually be maintained in the upper part of the bend in the trap, which body of air will serve as an insulation against the transmission of any heat through the body of milk from tank 9 to tank 4'.

Having thus described my invention, what I claim and desire to secure by Letters Patent is—

1. A milk heater comprising a tank having partitions in its lower portion dividing said portion into a plurality of compartments, a heater underlying the lowermost of said compartments, a cold milk tank arranged above the casing having a connecting pipe leading from it into the intermediate of the compartments in the lower part of the casing, said compartment adapted to be heated from a compartment below, a coffee urn contained within the casing above said compartments, and draw-offs from the coffee urn and said intermediate compartment.

2. A milk heater comprising a casing having horizontal partitions in its lower portion dividing said portion into a plurality of compartments, a heater underlying the lowermost compartment, a non heat-conducting shelf above the casing, a cold milk tank supported on said shelf and protected from the heat of the underlying casing, a trapped-pipe connecting the cold milk tank with the intermediate of the compartments in the lower part of the casing, said compartment adapted to be heated from the compartment below, a coffee urn within the upper portion of the casing, and separate draw-offs from said urn and said intermediate compartment.

In testimony whereof I have hereunto set my hand in presence of two subscribing witnesses.

ADOLPH H. SCHLUETER.

Witnesses:
 CHARLES QUAYLE,
 HARRY M. LEVY.